United States Patent
Sakamoto et al.

(10) Patent No.: US 11,485,847 B2
(45) Date of Patent: Nov. 1, 2022

(54) METHACRYLIC RESIN COMPOSITION, MOLDED ARTICLE, AND FILM

(71) Applicant: KURARAY CO., LTD., Kurashiki (JP)

(72) Inventors: Shigeru Sakamoto, Tainai (JP); Takuro Niimura, Tainai (JP); Taketomo Yamashita, Tainai (JP); Atsuhiro Nakahara, Chiyoda-ku (JP)

(73) Assignee: KURARAY CO., LTD., Kurashiki (JP)

( * ) Notice: Subject to any disclaimer, the term of this patent is extended or adjusted under 35 U.S.C. 154(b) by 202 days.

(21) Appl. No.: 16/956,227

(22) PCT Filed: Dec. 20, 2018

(86) PCT No.: PCT/JP2018/046983
§ 371 (c)(1),
(2) Date: Jun. 19, 2020

(87) PCT Pub. No.: WO2019/124493
PCT Pub. Date: Jun. 27, 2019

(65) Prior Publication Data
US 2021/0079207 A1  Mar. 18, 2021

(30) Foreign Application Priority Data

Dec. 21, 2017 (JP) ............................ JP2017-244656

(51) Int. Cl.
*C08L 33/12* (2006.01)
*C08L 27/16* (2006.01)
*C08L 53/02* (2006.01)

(52) U.S. Cl.
CPC ............... *C08L 33/12* (2013.01); *C08L 27/16* (2013.01); *C08L 53/02* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| 2004/0191550 | A1 | 9/2004 | Maekawa et al. |
| 2015/0079368 | A1* | 3/2015 | Koike .................. B32B 27/302 428/215 |
| 2017/0313834 | A1 | 11/2017 | Hiraoka et al. |

FOREIGN PATENT DOCUMENTS

| EP | 3 284 784 A1 | 2/2018 |
| JP | 10-101748 A | 4/1998 |
| JP | 2004-306601 A | 11/2004 |
| JP | 2006-300225 A | 11/2006 |
| JP | 2008-12689 A | 1/2008 |
| JP | 2009-161744 A | 7/2009 |
| JP | 2013-213087 A | 10/2013 |
| JP | 2013213087 A * | 10/2013 |
| JP | 2015-206024 A | 11/2015 |
| JP | 2016-8225 A | 1/2016 |
| JP | 2017-185760 A | 10/2017 |
| WO | WO 2016/076357 A1 | 5/2016 |
| WO | WO 2016/167292 A1 | 10/2016 |

OTHER PUBLICATIONS

Adeka Corp., Product Data Sheet for ADK STAB LA-31. Nov. 10, 2009. Retrieved from mychem.ir on Mar. 4, 2022. (Year: 2009).*
International Search Report dated Mar. 19, 2019 in PCT/JP2018/046983 filed on Dec. 20, 2018, 2 pages.

* cited by examiner

*Primary Examiner* — Richard A Huhn
(74) *Attorney, Agent, or Firm* — Oblon, McClelland, Maier & Neustadt, L.L.P.

(57) ABSTRACT

The present invention provides a methacrylic resin composition comprising 75 to 99.8 mass % of a methacrylic resin [A], 0.1 to 15 mass % of a UV absorber [B], and 0.1 to 10 mass % of a polymer [C] having an SP value of 6.0 to 9.7 $(\text{cal/cm}^3)^{1/2}$ calculated by the Fedors method.

8 Claims, No Drawings

METHACRYLIC RESIN COMPOSITION, MOLDED ARTICLE, AND FILM

TECHNICAL FIELD

The present invention relates to a methacrylic resin composition, and molded articles, such as films, using the same. More specifically, the present invention relates to a methacrylic resin composition that can be melt-molded while suppressing die contamination etc., and that is suitable for giving molded articles that are less likely to undergo bleed-out of additives, such as UV absorbers; and also relates to molded articles, such as films, using the same.

BACKGROUND ART

Methacrylic resins have high transparency and are useful as materials of molded articles used for optical members, lighting members, sign members, decorative members, and the like. DV absorbers are kneaded into methacrylic resins for the purpose of preventing the deterioration of the methacrylic resins due to ultraviolet rays. Since UV absorbers are less compatible with methacrylic resins, the transparency decreases if a large amount of UV absorber is kneaded. In addition, the kneaded UV absorbers may adhere to rolls, dies, etc., during melt molding, causing "die contamination." When die contamination occurs, the surface properties of molded articles become deteriorated. It is necessary to regularly wash the rolls etc. in order to prevent die contamination, thereby reducing productivity. Furthermore, in thin molded articles kneaded with UV absorbers, the UV absorbers may bleed out, which deteriorates the characteristics of the molded articles.

PTL 1 discloses a methacrylic resin composition comprising a methacrylic resin and a block or graft copolymer, and indicates that the compatibility between the UV absorber and the methacrylic resin is enhanced by the addition of the block or graft copolymer, so that bleed-out can be reduced.

PTL 2 discloses an acrylic resin film comprising a multilayer structure containing a polymer comprising alkyl methacrylate and a polymerizable light stabilizer, and indicates that the bleed-out of additives etc. can be reduced by copolymerizing the light stabilizer with the alkyl methacrylate.

However, for example, due to the reduction of the thickness of films, the volume that could contain a certain amount of UV absorber was reduced. To increase the concentration, further measures were required to make bleed-out less likely to occur.

CITATION LIST

Patent Literature

PTL 1: WO2016/167292
PTL 2: JPH10-101748A

SUMMARY OF INVENTION

Technical Problem

An object of the present invention is to provide a methacrylic resin composition that can be melt-molded while suppressing die contamination etc., and that is suitable for giving molded articles that are less likely to undergo bleed-out of UV absorbers etc.; and to also provide molded articles, such as films, using the same.

Solution to Problem

In order to achieve the above objects, the present inventors conducted extensive research. The present inventors have thus completed the invention encompassing the following embodiments.

Specifically, the present invention provides the following:

[1] A methacrylic resin composition comprising 75 to 99.8 mass % of a methacrylic resin [A], 0.1 to 15 mass % of a UV absorber [B], and 0.1 to 10 mass % of a polymer [C] having an SP value of 6.0 to 9.7 $(cal/cm^3)^{1/2}$ calculated by the Fedors method.

[2] The methacrylic resin composition according to [1], wherein the methacrylic resin [A] comprises a crosslinked rubber component.

[3] The methacrylic resin composition according to [1] or [2], wherein the UV absorber [B] is a benzotriazole or triazine-based compound

[4] The methacrylic resin composition according to any one of [1] to [3], wherein the polymer [C] is a polymer having a fluorine atom in its structure.

[5] A molded article comprising the methacrylic resin composition according to any one of [1] to [4].

[6] The molded article according to [5], which is a film having a total light transmittance of 90% or more.

[7] A method for producing the molded article according to [5] or [6], the method comprising the step of melt-extruding the methacrylic resin composition according to any one of [1] to [4] to obtain a molded article.

Advantageous Effects of Invention

The methacrylic resin composition of the present invention can be melt-molded while suppressing die contamination etc. Molded articles, such as films, using the methacrylic resin composition of the present invention are less likely to undergo bleed-out of UV absorbers.

DESCRIPTION OF EMBODIMENTS

The present invention is described in more detail below.

The methacrylic resin composition of the present invention comprises 75 to 99.8 mass % of a methacrylic resin [A], 0.1 to 15 mass % of a UV absorber [B], and 0.1 to 10 mass % of a polymer [C] having an SP value of 6.0 to 9.7 $(cal/cm^3)^{1/2}$ calculated by the Fedors method.

Methacrylic Resin [A]

The methacrylic resin [A] is a homopolymer consisting of a structural unit derived from methyl methacrylate (hereinafter, this is also referred to as the methacrylic resin [A0]), a random copolymer comprising a structural unit derived from methyl methacrylate and a structural unit derived from another monomer (hereinafter, this random copolymer is also referred to as the methacrylic resin [A1]), or a polymer comprising a crosslinked rubber component (hereinafter, this polymer is also referred to as the methacrylic resin [A2]). Because a crosslinked rubber component is contained, the elongation of the methacrylic resin composition is improved. The methacrylic resin [A] may be a commercially available methacrylic resin.

In the methacrylic resin [A1] used in the present invention, the total content of structural units derived from methyl methacrylate is preferably 90 mass % or more and 99.9 mass % or less, more preferably 95 mass % or more and 99.9% or less, even more preferably 98 mass % or more and 99.9 mass % or less, and particularly preferably 99 mass % or more and 99.9 mass % or less, from the viewpoint of heat resistance etc.

The methacrylic resin [A1] contains structural units derived from monomers other than methyl methacrylate. Examples of monomers other than methyl methacrylate include alkyl methacrylate esters other than methyl methacrylate, such as ethyl methacrylate and butyl methacrylate; aryl methacrylate esters, such as phenyl methacrylate; cycloalkyl methacrylate esters, such as cyclohexyl methacrylate and norbornenyl methacrylate; alkyl acrylate esters, such as methyl acrylate, ethyl acrylate, propyl acrylate, butyl acrylate, and 2-ethylhexyl acrylate; aryl acrylate esters, such as phenyl acrylate; cycloalkyl acrylate esters, such as cyclohexyl acrylate and norbornenyl acrylate; aromatic vinyl compounds, such as styrene and $\alpha$-methylstyrene; acrylamide; methacrylamide; acrylonitrile; methacrylonitrile; and like vinyl monomers having only one polymerizable carbon-carbon double bond in one molecule.

The methacrylic resin [A0] or methacrylic resin [A1] preferably has a polystyrene-equivalent weight average molecular weight $Mw_{A0}$ or $Mw_{A1}$ of 50000 to 200000, more preferably 55000 to 160000, and even more preferably 60000 to 120000, calculated based on the chromatogram obtained by gel permeation chromatography. As $Mw_{A0}$ or $Mw_{A1}$ increases, molded articles obtained from the methacrylic resin [A0] or methacrylic resin [A1] tend to have higher strength. As $Mw_{A0}$ or $Mw_{A1}$ decreases, the methacrylic resin [A0] or methacrylic resin [A1] tends to have higher moldability, and the resulting molded articles tend to have better surface smoothness.

In the methacrylic resin [A0] or methacrylic resin [A1], the ratio of the weight average molecular weight $Mw_{A0}$ or $Mw_{A1}$ to the polystyrene-equivalent number average molecular weight $Mn_{A0}$ or $Mn_{A1}$ calculated based on the chromatogram obtained by gel permeation chromatography, i.e., $Mw_{A0}/Mn_{A0}$ or $Mw_{A1}/Mn_{A1}$ (molecular weight distribution), is preferably 1.0 to 5.0, more preferably 1.2 to 2.5, and even more preferably 1.3 to 1.7. As $Mw_{A0}/Mn_{A0}$ or $Mw_{A1}/Mn_{A1}$ decreases, impact resistance and toughness tend to increase. As $Mw_{A0}/Mn_{A0}$ or $Mw_{A1}/Mn_{A1}$ increases, the methacrylic resin [A0] or methacrylic resin [A1] tends to have higher melt flowability, and the resulting molded articles tend to have better surface smoothness.

In the methacrylic resin [A0] or methacrylic resin [A1] used in the present invention, the content of components with a molecular weight of more than 200000 (high-molecular-weight components) is preferably 0.1 to 10%, and more preferably 0.5 to 5%. Further, in the methacrylic resin [A0] or methacrylic resin [A1] used in the present invention, the content of components with a molecular weight of less than 15000 (low-molecular-weight components) is preferably 0.1 to 5%, and more preferably 0.2 to 3%. Because the methacrylic resin [A0] or methacrylic resin [A1] contains high-molecular-weight components and/or low-molecular-weight components within the above ranges, the film-forming properties are improved, and films having a uniform film thickness are easily obtained.

The content of components with a molecular weight of more than 200000 is calculated as the ratio of the area of a portion surrounded by the base line and the chromatogram detected before the retention time of standard polystyrene having a molecular weight of 200000, with respect to the area of a portion surrounded by the base line and the chromatogram measured by GPC. The content of components with a molecular weight of less than 15000 is calculated as the ratio of the area of a portion surrounded by the base line and the chromatogram detected after the retention time of standard polystyrene having a molecular weight of 15000, with respect to the area of a portion surrounded by the base line and the chromatogram obtained by GPC.

The measurement by gel permeation chromatography is performed as follows. Tetrahydrofuran is used as the eluent, and two TSKgel SuperMultipore HZM-M columns and a SuperHZ4000 column (produced by Tosoh Corporation) are connected in series. The analysis device used is HLC-8320 (product number, produced by Tosoh Corporation) equipped with a differential refractive index detector (RI detector). 4 mg of methacrylic resin as a test object is dissolved in 5 ml of tetrahydrofuran to prepare a test object solution. The temperature of a column oven is set to 40° C., and 20 µl of test object solution is poured at an eluent flow rate of 0.35 ml/min, and the chromatogram is measured.

The chromatogram is a chart plotting the electrical signal value (intensity Y) derived from the refractive index difference between the test object solution and the reference solution, relative to the retention time X.

Standard polystyrenes having a molecular weight of 400 to 5000000 are measured by gel permeation chromatography to create a calibration curve showing the relationship between retention time and molecular weight. The base line is obtained by connecting a point at which the slope of the peak on the high-molecular-weight side of the chromatogram changes from zero to positive, and a point at which the slope of the peak on the low-molecular-weight side changes from negative to zero. When the chromatogram shows multiple peaks, the base line is obtained by connecting a point at which the slope of the peak on the highest-molecular-weight side changes from zero to positive, and a point at which the slope of the peak on the lowest-molecular-weight side changes from negative to zero.

The methacrylic resin [A0], [A1], or [A2] preferably has a melt flow rate of 0.1 to 30 g/10 min, more preferably 0.5 to 20 g/10 min, and even more preferably 1 to 15 g/10 min, determined by measurement at 230° C. and a load of 3.8 kg.

Due to the use of the methacrylic resin [A2] containing a crosslinked rubber component, the elongation of the methacrylic resin composition of the present invention is improved. The crosslinked rubber component can be separated as a supernatant (an acetone solution of the acetone-soluble component [A2Y]) and a precipitate (an acetone-swollen product of the crosslinked rubber component [A2X]) by adding acetone to the methacrylic resin [A2], and leaving it at room temperature for one day, followed by stirring and centrifugation (at 20,000 rpm for 200 minutes). The acetone-soluble component [A2Y] may not be used. In that case, the supernatant contains only acetone. Although the crosslinked rubber component [A2X] is not particularly limited, preferable examples are provided below.

The crosslinked rubber component [A2X] in the present invention is preferably a spherical particulate multilayer structure polymer comprising a crosslinked rubber polymer (I) containing an elastic layer mainly having a unit derived from an alkyl acrylate ester monomer having a $C_{1-8}$ alkyl group and/or a unit derived from a conjugated diene monomer, and an outermost layer polymer (II) comprising 80 to 97 mass % of methyl methacrylate unit and 3 to 20 mass % of acrylate ester unit, and graft-bonded to the crosslinked rubber polymer (I).

The crosslinked rubber polymer (I) is preferably a polymer mainly comprising an alkyl acrylate ester, and may be a copolymer of 50 mass % or more of alkyl acrylate ester and 50 mass % or less of monomer other than the alkyl acrylate ester. As the alkyl acrylate ester, those having a $C_{4-8}$ alkyl group, such as butyl acrylate, hexyl acrylate, and octyl acrylate, are preferably used. Moreover, examples of monomers other than the alkyl acrylate ester include monofunctional monomers, such as alkyl methacrylate esters (e.g., methyl methacrylate and ethyl methacrylate), styrene-based monomers (e.g., styrene and alkyl styrene), and unsaturated nitriles (e.g., acrylonitrile and methacrylonitrile); and graft-bonding polyfunctional monomers, such as alkenyl esters of unsaturated carboxylic acids (e.g., allyl (meth)acrylate and methallyl (meth)acrylate), dialkenyl esters of dibasic acids (e.g., diallyl maleate), and unsaturated carboxylic acid diesters of glycols (e.g., alkylene glycol di(meth)acrylate).

The crosslinked rubber polymer (I) of the present invention may be a single layer or may have a structure having a polymer layer mainly comprising an alkyl methacrylate ester as its inner layer. When the crosslinked rubber polymer (I) is a single layer, the crosslinked rubber component [A2X] has a two-layer structure of a core layer (and an elastic layer: the crosslinked rubber polymer (I)) and an outer layer (the outermost layer polymer (II)). When the crosslinked rubber polymer (I) has a structure having a polymer layer mainly comprising an alkyl methacrylate ester as its inner layer, the crosslinked rubber component [A2X] has a three-layer structure of an inner layer (the polymer layer mainly comprising an alkyl methacrylate ester), an intermediate elastic layer (the crosslinked rubber polymer (I)), and an outer layer (the outermost layer polymer (II)).

The outermost layer polymer (II) of the multilayer structure polymer comprises 80 to 97 mass % of a methyl methacrylate unit and 3 to 20 mass % of an alkyl acrylate ester unit, and is graft-bonded to the crosslinked rubber polymer (I).

The crosslinked rubber component [A2X] is preferably produced by an emulsion polymerization method. The type and amount of emulsifier used for emulsion polymerization are selected depending on the stability of the polymerization system, the target particle diameter, etc.; however, known emulsifiers, such as anionic surfactants, cationic surfactants, and nonionic surfactants, can be used singly or in a combination. Anionic surfactants are particularly preferable. Examples of anionic surfactants include carboxylate salts, such as sodium stearate, sodium myristate, and sodium N-lauroyl sarcosinate; sulfonate salts, such as sodium dioctyl sulfosuccinate and sodium dodecylbenzene sulfonate; sulfate ester salts, such as sodium lauryl sulfate; phosphate ester salts, such as sodium mono-n-butylphenylpentaoxyethylene phosphate; polyoxyethylene alkyl ether carboxylate salts, such as sodium polyoxyethylene tridecyl ether acetate and sodium polyoxyethylene didecyl ether acetate; polyoxyethylene alkylphenyl ether phosphate salts; and the like. Among these, carboxylate salts or phosphate salts having a polyoxyethylene alkyl ether group or a polyoxyethylene phenyl ether group are preferable. Specific examples thereof include sodium polyoxyethylene tridecyl ether acetate and sodium polyoxyethylene alkylphenyl ether phosphate.

Although the polymerization initiator used for emulsion polymerization is not particularly limited, usable examples thereof include inorganic peroxides, such as potassium persulfate and ammonium persulfate; hydrogen peroxide-ferrous salt-based, potassium persulfate-sodium hydrogen sulfite, and ammonium persulfate-sodium hydrogen sulfite-based water-soluble redox initiators; and cumene hydroperoxide-sodium formaldehyde sulfoxylate-based and tert-butyl hydroperoxide-sodium formaldehyde sulfoxylate-based water-soluble or oil-soluble redox initiators.

Further, examples of optionally used chain transfer agents include alkyl mercaptans, such as n-octyl mercaptan, n-dodecyl mercaptan, t-dodecyl mercaptan, 1,4-butanedithiol, 1,6-hexanedithiol, ethylene glycol bisthiopropionate, butanediol bisthioglycolate, butanediol bisthiopropionate, hexanediol bisthioglycolate, hexanediol bisthiopropionate, trimethylolpropane tris-(β and pentaerythritol tetrakisthiopropionate. Among these, monofunctional alkyl mercaptans, such as n-octyl mercaptan and n-dodecyl mercaptan, are preferable.

In the emulsion polymerization of each layer performed in the order of the crosslinked rubber polymer (I) and the outermost layer polymer (II), monomers, emulsifiers, initiators, chain transfer agents, etc., may be added by any known method, such as a batch addition method, a divided addition method, or a continuous addition method.

The acetone-soluble component [A2Y] in the methacrylic resin [A2] may be a polymer consisting of a structural unit derived from methyl methacrylate (hereinafter, this is also referred to as the methacrylic resin [A2Y0]), or a random copolymer comprising a structural unit derived from methyl methacrylate and a structural unit derived from another monomer (hereinafter, this is also referred to as the methacrylic resin [A2Y1]). Although it depends on the method for producing the multilayer structure polymer described above, a polymer that has a structure corresponding to the outermost layer polymer (II) and is not graft-bonded to the crosslinked rubber polymer (I) may be obtained together in the production thereof. Such a polymer can also be used as the acetone-soluble component [A2Y] in the methacrylic resin [A].

In the acetone-soluble component [A2Y] of the present invention, the content of the monomer other than methyl methacrylate is preferably 0 to 20 mass %, more preferably 3 to 18 mass %, and even more preferably 5 to 15 mass %, from the viewpoint of film-forming properties.

Examples of the monomer other than methyl methacrylate contained in the methacrylic resin [A2Y1] include the same monomers as those in the methacrylic resin [A1].

The methacrylic resin [A2Y0] or methacrylic resin [A2Y1] preferably has a polystyrene-equivalent weight average molecular weight $Mw_{A2Y0}$ or $Mw_{A2Y1}$ of 50000 to 200000, more preferably 55000 to 160000, and even more preferably 60000 to 120000, calculated based on the chromatogram obtained by gel permeation chromatography (GPC). As $Mw_{A2Y0}$ or $Mw_{A2Y1}$ increases, molded articles obtained from the methacrylic resin composition tend to have higher strength. As $Mw_{A2Y0}$ or $Mw_{A2Y1}$ decreases, the methacrylic resin composition tends to have higher moldability, and the resulting molded articles tend to have better surface smoothness.

In the methacrylic resin [A2Y0] or methacrylic resin [A2Y1], the ratio of the weight average molecular weight $Mw_{A2Y0}$ or $Mw_{A2Y1}$ to the polystyrene-equivalent number average molecular weight $Mn_{A2Y0}$ or $Mn_{A2Y1}$ calculated based on the chromatogram obtained by GPC, i.e., $Mw_{A2Y0}/Mn_{A2Y0}$ or $Mw_{A2Y1}/Mn_{A2Y1}$ (molecular weight distribution), is preferably 1.0 to 5.0, more preferably 1.2 to 4.0, and even more preferably 1.5 to 3.5. As $Mw_{A2Y0}/Mn_{A2Y0}$ or $Mw_{A2Y1}/Mn_{A2Y1}$ decreases, the resulting molded articles tend to have better impact resistance and toughness. As $Mw_{A2Y0}/Mn_{A2Y0}$ or $Mw_{A2Y1}/Mn_{A2Y1}$ increases, the methacrylic resin composition tends to have higher melt flowability, and the resulting molded articles tend to have higher surface smoothness.

In the methacrylic resin [A2Y0] or methacrylic resin [A2Y1], the content of components with a molecular weight of more than 200000 (high-molecular-weight components)

is preferably 0.1 to 10%, and more preferably 0.5 to 5%. Further, in the methacrylic resin [A2Y0] or methacrylic resin [A2Y1] used in the present invention, the content of components with a molecular weight of less than 15000 (low-molecular-weight components) is preferably 0.1 to 5%, and more preferably 0.2 to 3%. Because the methacrylic resin [A2Y0] or methacrylic resin [A2Y1] contains high-molecular-weight components and/or low-molecular-weight components in the above ranges, the film-forming properties are improved, and films having a uniform film thickness are easily obtained.

The content of components with a molecular weight of more than 200000 and the content of components with a molecular weight of less than 15000 are calculated by the method described above.

In the preparation of the methacrylic resin [A2], the mass ratio of the multilayer structure polymer that forms the crosslinked rubber component [A2X] and comprises the crosslinked rubber polymer (I) and the outermost layer polymer (II), and the methacrylic resin [A2Y0] or [A2Y1] that forms the main part of the acetone-soluble component [A2Y] is preferably 5:95 to 100:0, more preferably 10:90 to 90:10, and even more preferably 20:80 to 80:20. The mass ratio of [A2X] and [A2Y] is preferably 5:95 to 100:0, more preferably 10:90 to 90:10, and even more preferably 20:80 to 80:20. The content of the crosslinked rubber component [A2X] is preferably within the above range, in terms of impact resistance and processability.

The method for producing the methacrylic resin [A0], [A1], [A2Y0], or [A2Y1] used in the present invention is not particularly limited. For example, they can be obtained by polymerizing methyl methacrylate, or by polymerizing methyl methacrylate and other monomers. The polymerization can be performed by a known method. Examples of polymerization methods classified according to the mode of chain transfer include radical polymerization, anionic polymerization, and the like. Other examples classified according to the form of the reaction liquid include bulk polymerization, solution polymerization, suspension polymerization, emulsion polymerization, and the like. Each of the characteristics described above can be achieved by adjusting the polymerization conditions, such as the polymerization temperature, the polymerization time, the type and amount of chain transfer agent and the timing of addition thereof, and the type and amount of polymerization initiator and the timing of addition thereof. Such a technique of controlling the characteristics by the polymerization conditions is well known to those skilled in the art, and it would not be difficult for those skilled in the art to produce resins having the desired characteristics.

UV Absorber [B]

As the UV absorber [B] used in the present invention, known UV absorbers that may be mixed with thermoplastic resins can be used. If the molecular weight of the UV absorber [B] is less than 200, phenomena such as foaming may occur during molding of the methacrylic resin composition. Accordingly, the molecular weight of the UV absorber [B] is preferably 200 or more, more preferably 300 or more, even more preferably 500 or more, and particularly preferably 600 or more.

UV absorbers are generally compounds having the ability to absorb ultraviolet rays. UV absorbers are compounds that are said to have the function of mainly converting light energy into heat energy.

Examples of UV absorbers include benzophenones, benzotriazoles, triazines, benzoates, salicylates, cyanoacrylates, oxalic acid anilides, malonic acid esters, formamidines, and the like. These may be used singly or in a combination of two or more. Preferable among these are benzotriazoles (compounds having a benzotriazole skeleton) and triazines (compounds having a triazine skeleton). Benzotriazoles or triazines are highly effective in suppressing resin deterioration (e.g., yellowing) due to ultraviolet rays.

Examples of benzotriazoles include 2-(2H-benzotriazol-2-yl)-4-(1,1,3,3-tetramethylbutyl)phenol (produced by BASF; trade name: Tinuvin 329), 2-(2H-benzotriazol-2-yl)-4,6-bis(1-methyl-1-phenylethyl)phenol (produced by BASF; trade name: Tinuvin 234), 2,2'-methylenebis[6-(2H-benzotriazol-2-yl)-4-tert-octylphenol] (produced by ADEKA Corporation; LA-31), 2-(5-octylthio-2H-benzotriazol-2-yl)-6-tert-butyl-4-methylphenol, and the like.

Examples of triazines include 2,4,6-tris(2-hydroxy-4-hexyloxy-3-methylphenyl)-1,3,5-triazine (produced by ADEKA Corporation; LA-F70), and analogs thereof such as hydroxyphenyl triazine UV absorbers (produced by BASF; CGL 777, Tinuvin 460, Tinuvin 479, Tinuvin 1600, etc.) and 2,4-diphenyl-6-(2-hydroxy-4-hexyloxyphenyl)-1,3,5-triazine (produced by Chemipro Kasei Kaisha, Ltd.; Kemisorb 102).

Other preferable examples include UV absorbers having a maximum molar absorption coefficient $\varepsilon_{max}$ of 1200 $dm^3 \cdot mol^{-1} \cdot cm^{-1}$ or less at a wavelength of 380 to 450 nm. Examples of such UV absorbers include 2-ethyl-2'-ethoxy-oxalanilide (produced by Clariant Japan K.K.; trade name: Sandeuboa VSU) and the like.

The maximum molar absorption coefficient $\varepsilon_{max}$ of the UV absorber is measured as follows. 10.00 mg of UV absorber is added to 1 L of cyclohexane and dissolved so that there is no undissolved substance by visual observation. This solution is poured into a quartz glass cell (1 cm×1 cm×3 cm), and the absorbance at a wavelength of 380 to 450 nm is measured using a U-3410 spectrophotometer (produced by Hitachi, Ltd.). From the molecular weight ($M_{UV}$) of the UV absorber and the measured maximum absorbance ($A_{max}$), the maximum molar absorption coefficient $\varepsilon_{max}$ is calculated by the following formula:

$$\varepsilon_{max} = [\varepsilon_{max}/(10 \times 10^{-3})] \times M_{UV}$$

Polymer [C]

The polymer [C] used in the present invention has an SP value of 6.0 to 9.7 $(cal/cm^3)^{1/2}$, preferably 6.1 to 9.6 $(cal/cm^3)^{1/2}$, and more preferably 6.2 to 9.5 $(cal/cm^3)^{1/2}$, calculated by the Fedors method. It is considered that because the SP value of the polymer [C] is within the above range, the methacrylic resin [A] and the polymer [C] have good compatibility, that the mobility of the UV absorber [B] inside the methacrylic resin [A] is reduced, and that the bleed-out of the UV absorber etc. is suppressed. It is also possible to obtain molded articles with excellent transparency.

The Fedors method is a method of calculating the SP value from the structural formula. The SP value was calculated using the following formula while citing the cohesive energy ($E_{coh}$) and the molar molecular volume (V) from "POLYMER HANDBOOK," 4th edition, J. Brandrup et al. (John Wiley & Sons, Inc.) (see pages 675 to 714).

$$\delta = [\Sigma E_{coh}/\Sigma V]^{1/2}$$

The polymer [C] used in the present invention has a weight average molecular weight of 20000 to 300000, preferably 40000 to 300000, and more preferably 60000 to 300000. The weight average molecular weight is measured by the method described above. Because the weight average molecular weight of the polymer [C] is set within the above range, it is possible to add it without volatilization during melt molding.

The monomer that forms the polymer [C] used in the present invention is not particularly limited. Examples thereof include olefin compounds, such as ethylene, propylene, butylene, and isobutene; conjugated dienes, such as butadiene and isoprene, or hydrogenated products thereof; fluorine vinyl compounds, such as vinylidene fluoride, vinyl fluoride, tetrafluoroethylene, and hexafluoropropylene; aromatic vinyl compounds, such as styrene and α-methylstyrene; and (meth)acrylate esters, such as methyl (meth) acrylate, ethyl (meth)acrylate, n-propyl acrylate, isopropyl acrylate, and n-butyl (meth)acrylate. These monomers may be used singly or in a combination of two or more.

The polymer [C] used in the present invention is preferably a fluorine-based polymer or a block copolymer comprising a styrene-based polymer block-hydrogenated diene-based polymer block, from the viewpoint of the compatibility with the methacrylic resin [A] and the transparency of the resulting methacrylic resin composition.

Methacrylic Resin Composition

The methacrylic resin composition of the present invention comprises 75 to 99.8 mass % of methacrylic resin [A]. The content of the methacrylic resin [A] is preferably 82 to 99.5 mass %, and more preferably 89 to 99.2 mass %. Because the methacrylic resin [A] is contained in the above range, molded articles having excellent transparency and heat resistance can be obtained.

The methacrylic resin composition of the present invention comprises 0.1 to 15 mass % of UV absorber [B]. The content of the UV absorber [B] is preferably 0.2 to 10 mass %, and more preferably 0.3 to 5 mass %. When the UV absorber [B] is contained in the above range, it is easy to adjust the light transmittance at a wavelength of 380 nm to 5% or less in thin molded articles. The total content of the UV absorber [B] and other additives in the methacrylic resin composition of the present invention is preferably 0.5 to 20 mass %, more preferably 1 to 17 mass %, even more preferably 2 to 15 mass %, and particularly preferably 2.5 to 10 mass %, with respect to the methacrylic resin composition of the present invention. Although specific examples of other additives will be described later, the calculation of the content of other additives does not include the polymer [C].

The methacrylic resin composition of the present invention comprises 0.1 to 10 mass % of polymer [C] having an SP value of 6.0 to 9.7 $(cal/cm^3)^{1/2}$. The content of the polymer [C] is preferably 0.3 to 8 mass %, and more preferably 0.5 to 6 mass %. When the polymer [C] is contained in the above range, bleed-out and evaporation of the UV absorber etc. are suppressed, and light resistance and weather resistance can be exhibited while maintaining the heat resistance of the methacrylic resin composition.

The methacrylic resin composition of the present invention may contain a filler, if necessary, as long as the effects of the present invention are not impaired. Examples of fillers include calcium carbonate, talc, carbon black, titanium oxide, silica, clay, barium sulfate, magnesium carbonate, and the like. The amount of the filler that can be contained in the methacrylic resin composition of the present invention is preferably 3 mass % or less, and more preferably 1.5 mass % or less. The filler is not included in the "other additives."

The methacrylic resin composition of the present invention may contain other polymers that are not included in the methacrylic resin [A] and the polymer [C], as long as the effects of the present invention are not impaired. Examples of other polymers include phenoxy resins; polycarbonate resins; polyolefin resins, such as polyethylene, polypropylene, polybutene-1, poly-4-methylpentene-1, and polynorbornene; ethylene-based ionomers; styrene-based resins, such as polystyrene, styrene-maleic anhydride copolymer, high-impact polystyrene, AS resin, ABS resin, AES resin, AAS resin, ACS resin, and MBS resin; methyl methacrylate-styrene copolymers; polyester resins, such as polyethylene terephthalate and polybutylene terephthalate; polyamides, such as nylon 6, nylon 66, and polyamide elastomer; polyvinyl chloride, polyvinylidene chloride, polyvinyl alcohol, ethylene-vinyl alcohol copolymers, polyacetal, polyvinylidene fluoride, polyurethane, modified polyphenylene ether, polyphenylene sulfide, and silicone-modified resin; silicone rubber; styrene-based thermoplastic elastomers, such as SEPS, SEBS, and SIS; olefin-based rubber, such as IR, EPR, and EPDM; and the like. The other polymer contained in the methacrylic resin composition of the present invention is preferably a polycarbonate resin from the viewpoint of transparency and heat resistance. The content of the other polymer in the methacrylic resin composition of the present invention is preferably 20 mass % or less, and more preferably 10 mass % or less. The "other polymers that are not included in the methacrylic resin [A] and the polymer [C]" are not included in the "other additives."

The methacrylic resin composition of the present invention may contain other additives, such as antioxidants, thermal deterioration inhibitors, light stabilizers, lubricants, release agents, polymeric processing aids, organic dyes, phosphors, antistatic agents, flame retardants, dyes and pigments, light diffusing agents, matting agents, and impact modifiers, as long as the effects of the present invention are not impaired.

Antioxidants alone have an effect of preventing oxidative deterioration of resins in the presence of oxygen. Examples thereof include phosphorus antioxidants, hindered phenolic antioxidants, thioether antioxidants, and the like. Among these, from the viewpoint of preventing the deterioration of optical properties due to coloring, phosphorus antioxidants and hindered phenolic antioxidants are preferable, and a combination of a phosphorus antioxidant and a hindered phenolic antioxidant is more preferable.

When a phosphorus antioxidant and a hindered phenolic antioxidant are used in combination, it is preferable to use the phosphorus antioxidant and the hindered phenolic antioxidant at a mass ratio of 0.2/1 to 2/1, and more preferably 0.5/1 to 1/1.

Examples of phosphorus antioxidants include 2,2-methylenebis(4,6-di-tert-butylphenyl)octyl phosphite (produced by ADEKA Corporation; trade name: Adekastab HP-10), tris(2,4-di-tert-butylphenyl)phosphite (produced by BASF; trade name: Irgafos 168), 3,9-bis(2,6-di-tert-butyl-4-methylphenoxy)-2,4,8,10-tetraoxa-3,9-diphosphaspiro[5.5]undecane (produced by ADEKA Corporation; trade name: Adekastab PEP-36), and the like.

Preferable examples of hindered phenolic antioxidants include 3,5-di-tert-butyl-4-hydroxytoluene, pentaerythrityl-tetrakis[3-(3,5-di-tert-butyl-4-hydroxyphenyl)propionate] (produced by BASF; trade name: Irganox 1010), octadecyl-3-(3,5-di-tert-butyl-4-hydroxyphenyl)propionate (produced by BASF; trade name: Irganox 1076), and the like.

Thermal deterioration inhibitors can prevent thermal deterioration of resins by trapping polymer radicals generated when exposed to high heat in a substantially oxygen-free state.

Preferable examples of thermal deterioration inhibitors include 2-tert-butyl-6-(3'-tert-butyl-5'-methyl-hydroxybenzyl)-4-methylphenyl acrylate (produced by Sumitomo Chemical Co., Ltd.; trade name: Sumilizer GM), 2,4-di-tert-amyl-6-(3',5'-di-tert-amyl-2'-hydroxy-α-methylbenzyl)phenyl acrylate (produced by Sumitomo Chemical Co., Ltd.; trade name: Sumilizer GS), and the like.

Light stabilizers are compounds that are said to mainly have the function of trapping radicals generated by oxidation by light. Preferable examples of light stabilizers include hindered amines, such as compounds having a 2,2,6,6-tetraalkylpiperidine skeleton.

Examples of lubricants include stearic acid, behenic acid, stearoamide acid, methylenebisstearoamide, hydroxystearic acid triglyceride, paraffin wax, ketone wax, octyl alcohol, hardened oil, and the like.

Release agents are compounds having the function of facilitating the release from molding dies. Examples of release agents include higher alcohols, such as cetyl alcohol and stearyl alcohol; glycerin higher fatty acid esters, such as stearic acid monoglyceride and stearic acid diglyceride; and the like. In the present invention, it is preferable to use a higher alcohol and a glycerin fatty acid monoester in combination as a release agent. When a higher alcohol and a glycerin fatty acid monoester are used in combination, the mass ratio of higher alcohol to glycerin fatty acid monoester is preferably 2.5/1 to 3.5/1, and more preferably 2.8/1 to 3.2/1.

Polymeric processing aids are generally polymer particles having a particle diameter of 0.05 to 0.5 μm, which can be produced by an emulsion polymerization method. The polymer particles may be single-layer particles composed of a polymer having a single composition ratio and a single intrinsic viscosity, or may be multi-layer particles composed of two or more polymers having different composition ratios or intrinsic viscosities. Preferable among these are particles having a two-layer structure having a polymer layer with a low intrinsic viscosity as an inner layer, and a polymer layer with a high intrinsic viscosity of 5 dl/g or more as an outer layer. The polymeric processing aid preferably has an intrinsic viscosity of 3 to 6 dl/g.

As organic dyes, compounds having the function of converting ultraviolet rays, which are harmful to resins, into visible rays are preferably used.

Examples of light diffusing agents and matting agents include glass fine particles, polysiloxane-based crosslinked fine particles, crosslinked polymer fine particles, talc, calcium carbonate, barium sulfate, and the like.

Examples of phosphors include fluorescent pigments, fluorescent dyes, fluorescent white dyes, fluorescent whitening agents, fluorescent bleaching agents, and the like.

Examples of flame retardants include organic halogen-based flame retardants, such as tetrabromobisphenol decabromodiphenyl oxide, and brominated polycarbonate; non-halogen-based flame retardants, such as antimony oxide, aluminum hydroxide, zinc borate, and tricresyl phosphate; and the like.

Examples of antistatic agents include stearoamidopropyldimethyl-β-hydroxyethylammonium nitrate and the like.

Examples of dyes and pigments include titanium oxide, red iron oxide, and the like.

Examples of impact modifiers include core-shell modifiers containing acrylic rubber or diene rubber as a core layer component; modifiers containing a plurality of rubber particles; and the like.

These other additives, fillers, and other polymers may be used singly or in a combination of two or more. In addition, these other additives, fillers, and other polymers may be added to the polymerization reaction liquid in the production of the methacrylic resin [A] or the polymer [C], or to the produced methacrylic resin [A] or polymer [C], or may be added during preparation of the methacrylic resin composition. The total amount of the other additives, fillers, and other polymers contained in the methacrylic resin composition of the present invention is preferably 7 mass % or less, more preferably 5 mass % or less, and even more preferably 4 mass % or less, with respect to the methacrylic resin [A], from the viewpoint of suppressing appearance defects of the film to be obtained.

The method for preparing the methacrylic resin composition of the present invention is not particularly limited. Examples include a method of polymerizing a monomer (mixture) containing methyl methacrylate in the presence of the polymer [C], and a method of melt-kneading the methacrylic resin [A], the UV absorber [B], and the polymer [C]. Among these, a melt-kneading method is preferable because the process is simple. During melt kneading, other polymers, fillers, and other additives may be mixed, if necessary; or the methacrylic resin [A] may be mixed with other polymers, fillers, and other additives, and then mixed with the UV absorber [B] and the polymer [C]; or the UV absorber [B] may be mixed with other polymers, fillers, and other additives, and then mixed with the methacrylic resin [A] and the polymer [C]; or the polymer [C] may be mixed with other polymers, fillers, and other additives, and then mixed with the methacrylic resin [A] and the UV absorber [B]; or other methods may be used. Kneading can be performed, for example, using a known mixing device or kneading device, such as a kneader ruder, a single-screw or twin-screw extruder, a mixing roll, or a Banbury mixer. Among these, a twin-screw extruder is preferred. The temperature during mixing and kneading can be suitably adjusted depending on, for example, the melting temperatures of the methacrylic resin [A] and the polymer [C] used, and is preferably 110° C. to 300° C.

The weight average molecular weight (Mw) determined by measuring the methacrylic resin composition of the present invention by GPC is preferably 50000 to 200000, more preferably 55000 to 160000, even more preferably 60000 to 120000, and particularly preferably 70000 to 100000. The molecular weight distribution (weight average molecular weight Mw/number average molecular weight Mn) determined by measuring the methacrylic resin composition of the present invention by GPC is preferably 1.0 to 5.0, more preferably 1.2 to 3.0, even more preferably 1.3 to 2.0, and particularly preferably 1.3 to 1.7. When the Mw and the molecular weight distribution (Mw/Mn) are within the above ranges, the moldability of the methacrylic resin composition is improved, and molded articles excellent in impact resistance and toughness can be easily obtained.

The melt flow rate determined by measuring the methacrylic resin composition of the present invention at 230° C. and a load of 3.8 kg is preferably 0.1 to 30 g/10 min, more preferably 0.5 to 20 g/10 min, and even more preferably 1.0 to 15 g/10 min.

The methacrylic resin composition of the present invention can be in the form of pellets or the like, in order to facilitate convenience in storage, transportation, or molding.

The methacrylic resin composition of the present invention can be formed into molded articles, such as films (molded articles comprising the methacrylic resin composition of the present invention) by a known molding method. Examples of molding methods include melt-molding methods, such as T-die method (lamination method, co-extrusion method, etc.), inflation method (co-extrusion method, etc.), compression molding method, blow molding method, calendar molding method, vacuum molding method, and injection molding method (insertion method, two-color method, pressing method, core back method, sandwich method, etc.); and solution casting methods. Among these, melt extrusion is preferred.

In these molding methods, dies are generally used to mold resin compositions. Examples thereof include sheet-forming rolls, film-forming rolls, compression molding dies, blow molding dies, calendar rolls, vacuum-forming dies, injection molding dies, and other dies. The dies are not necessarily made of metal, and examples of dies include rubber rolls, tempered glass, and the like. Since the methacrylic resin composition of the present invention is less likely to cause die contamination, it can be preferably used for continuous production for a long period of time or production in which many molding processes are repeated.

The present invention includes molded articles and films using the methacrylic resin composition of the present invention. The thickness of the film is, for example, 20 to 200 μm.

Examples of the application of the molded articles using the methacrylic resin composition of the present invention include sign parts, such as advertising towers, stand signs, sleeve signs, transom signs, and rooftop signs; display parts, such as showcases, partition boards, and store displays; lighting parts, such as fluorescent light covers, mood lighting covers, lamp shades, light ceilings, light walls, and chandeliers; interior parts, such as pendants and mirrors; building parts, such as doors, domes, safety window panes, partitions, stair wainscots, balcony wainscots, roofs of leisure buildings, resin sashes, kitchen doors, and door surfaces; transportation-related parts, such as aircraft windshields, visors for pilots, motorcycles, windshields for motorboats, light shields for buses, side visors for automobiles, rear visors, head wings, and headlight covers; electronic equipment parts, such as audio-visual nameplates, stereo covers, TV protection masks, and display covers for vending machines; medical device parts, such as incubators and X-ray parts; equipment-related parts, such as machine covers, instrument covers, laboratory equipment, rulers, dials, and observation windows; optical-related parts, such as light guide plates and films for front lights for display devices, light guide plates and films for back lights, liquid crystal protective plates, Fresnel lenses, lenticular lenses, front panels, diffusing plates, and reflective materials of various displays; traffic-related parts, such as road signs, guide boards, curve mirrors, and soundproofing walls; film parts, such as surface materials for automobile interiors, surface materials for mobile phones, and marking films; parts for home appliances, such as canopy materials and control panels for washing machines, and roof panels for rice cookers; greenhouses, large aquariums, box aquariums, clock panels, bathtubs, sanitary, desk mats, game parts, toys, face protection masks during welding, and the like.

The molded articles using the methacrylic resin composition of the present invention have excellent weather resistance and suppress bleed-out of UV absorbers. Therefore, they can be used for optical equipments, for example, various covers, various terminal boards, printed wiring boards, speakers, microscopes, binoculars, cameras, and watches; video, optical recording, optical communication, and information equipment-related parts, for example, finders, filters, prisms, and Fresnel lenses of cameras, VCRs, and projection TVs, protective films for various optical disk (VD, CD, DVD, MD, LD, etc.) substrates; optical switches, optical connectors, liquid crystal displays, light guide films and sheets for liquid crystal displays, flat-panel displays, light guide films and sheets for flat-panel displays, plasma displays, light guide films and sheets for plasma displays, light guide films and sheets for electronic paper, phase difference films and sheets, polarizing films and sheets, polarizing plate protective films and sheets, polarizer protective films and sheets, wavelength plates, light diffusion films and sheets, prism films and sheets, reflection films and sheets, antireflection films and sheets, viewing angle-widening films and sheets, antiglare films and sheets, brightness enhancement films and sheets, display element substrates for liquid crystal and electroluminescence applications, touch panels, light guide films and sheets for touch panels, spacers between various front plates and various modules, and various other optical applications.

Specifically, they can be used, for example, for mobile phones, digital information terminals, navigation systems, in-vehicle liquid crystal displays, liquid crystal monitors, light control panels, OA equipment displays, AV equipment displays, and various other liquid crystal display elements, electroluminescence display elements, touch panels, and the like.

Further, in terms of excellent weather resistance, they can be particularly preferably applied, for example, to known building materials, such as interior and exterior building materials, curtain walls, roof members, roof materials, window members, rain gutters, exterior materials, wall materials, floor materials, construction materials, road construction materials, retroreflective films and sheets, agricultural films and sheets, lighting covers, signs, and translucent sound insulation walls.

The molded articles using the methacrylic resin composition of the present invention can also be applied to solar cell applications, such as solar cell front-surface protective films, solar cell sealing films, solar cell back-surface protective films, solar cell substrate films, and protective films for gas barrier films.

EXAMPLES

The present invention is described in more detail below with reference to Examples and Comparative Examples. However, the present invention is not limited to the following Examples.

Average Particle Diameter of Multilayer Structure Polymer

An emulsion containing a multilayer structure polymer was diluted with ion-exchanged water to a solid concentration of 0.05 mass %, spread on a glass plate, and dried to allow the individual particles to be present on the glass plate without aggregation. Platinum and palladium were deposited on the surface, an electron micrograph was obtained with a reflection electron microscope, and the particle diameters of 100 particles were randomly measured and averaged to obtain the average particle diameter. On the other hand, an emulsion containing a multilayer structure polymer was diluted to a solid concentration of 0.05 mass % and placed in a quartz cell having a measurement length of 10 mm, and the absorbance at 500 nm was measured. The above operation was performed on particles having different particle diameters to create a calibration curve of the average particle diameter by electron microscope observation and the absorbance at 500 nm. The average particle diameter of the multilayer structure polymer was determined by measuring the absorbance using this calibration curve.

Polymerization Conversion Rate

An InertCap 1 column (df=0.4 μm, 0.25 mm I.D.×60 m; produced by GL Sciences Inc.) was connected with a GC-14A gas chromatograph (produced by Shimadzu Corporation), and the measurement was performed under the following conditions: injection temperature: 180° C., detector temperature: 180° C., column temperature: raised from 60° C. (maintained for 5 minutes) to 200° C. at a heating rate of 10° C./min and maintained for 10 minutes. The polymerization conversion rate was calculated based on the results.

Measurement of Crosslinked Rubber Component [A2X] and Acetone-Soluble Component [A2Y]

2 g (w0) of precisely weighed methacrylic resin composition was added to 100 ml of acetone and stirred at room temperature for 24 hours. The obtained liquid was put into a centrifuge tube of known mass and centrifuged at 0° C. and 20000 rpm for 90 minutes (first centrifugation). Then, the supernatant was separated by decantation (supernatant 1), and the precipitate was left at the bottom of the centrifuge tube. Acetone was added to the precipitate of the centrifuge tube and stirred. This was centrifuged at 0° C. and 20000 rpm for 90 minutes (second centrifugation). Then, the supernatant was separated by decantation (supernatant 2).

Thereafter, the precipitate and the centrifuge tube were dried at 50° C. and 400 torr in a vacuum dryer for 2 hours to remove most of the acetone, and then dried at 80° C. and 760 torr for 8 hours. The total mass of the dried precipitate (crosslinked rubber component [A2X]) and the centrifuge tube was measured, and the mass of the centrifuge tube was subtracted from the total mass to obtain the mass (w1) of the crosslinked rubber component [A2X]. The mass % of the crosslinked rubber component [A2X] was calculated by the formula: 100× w1/w0, and the mass % of the acetone-soluble component [A2Y] was calculated by the formula:

$$100\times(w0-w1)/w0.$$

Weight Average Molecular Weight (Mw), Number Average Molecular Weight (Mn), and Molecular Weight Distribution (Mw/Mn)

The chromatogram was measured by gel permeation chromatography (GPC) under the following conditions, and the value converted into the molecular weight of standard polystyrene was calculated. The base line was obtained by connecting a point at which the slope of the peak on the high-molecular-weight side of the GPC chart changed from zero to positive when viewed from the side with a shorter retention time, and a point at which the slope of the peak on the low-molecular-weight side changed from negative to zero when viewed from the side with a shorter retention time.

GPC device: HLC-8320, produced by Tosoh Corporation
Detector: differential refractive index detector
Column: two TSKgel SuperMultipore HZM-M columns and a SuperHZ4000
column produced by Tosoh Corporation were connected in series
Eluent: tetrahydrofuran
Eluent flow rate: 0.35 ml/min
Column temperature: 40° C.
Calibration curve: prepared using data of ten standard polystyrenes Total Light Transmittance The methacrylic resin composition was hot-pressed to form a molded article (thickness: 3.2 mm), and the total light transmittance thereof was measured according to JIS K7361-1 using a haze meter (HM-150, produced by Murakami Color Research Laboratory).

Roll Contamination

The methacrylic resin composition was extruded with a film-forming machine (model: FS-5, produced by Optical Control Systems) under the following conditions: temperature of cylinder and T-die: 260° C., lip gap: 0.5 mm, extrusion rate: 2.4 kg/hr, roll temperature: 85° C., and film winding speed: 6.3 m/min. The film thickness was adjusted to 100 μm, and roll contamination during film formation was observed. The surface of the metal rolls through which the film passed was visually observed, and the roll contamination was evaluated by the time from the start of film formation until the occurrence of white haze on the entire surface of the rolls.

Production Example 1

Production of Acrylic Multilayer Structure Polymer (A-1)

1050 parts by mass of deionized water, 1 part by mass of sodium dodecylbenzene sulfonate, and 0.05 parts by mass of sodium carbonate were placed in a reactor equipped with a stirrer, a thermometer, a nitrogen gas inlet, a monomer inlet tube, and a reflux condenser. After the inside of the container was sufficiently replaced with nitrogen gas to make it substantially oxygen-free, the internal temperature was set to 80° C. Then, 0.01 parts by mass of potassium persulfate was added, and the mixture was stirred for 5 minutes. Thereafter, 26.3 parts by mass of monomer mixture comprising 49.9 mass % of methyl methacrylate, 49.9 mass % of n-butyl acrylate, and 0.2 mass % of allyl methacrylate was continuously added dropwise over 20 minutes. After the completion of the dropwise addition, the polymerization reaction was further performed for 30 minutes so that the polymerization conversion rate was 98% or more (inner layer: a layer of a polymer mainly comprising an alkyl methacrylate ester).

Subsequently, 0.05 parts by mass of potassium persulfate 3% aqueous solution was placed in the same reactor, and the mixture was stirred for 5 minutes. Then, 157.4 parts by mass of monomer mixture comprising 5.00 mass % of methyl methacrylate, 93.53 mass % of n-butyl acrylate, and 1.47 mass % of allyl methacrylate was continuously added dropwise over 40 minutes. After the completion of the dropwise addition, the polymerization reaction was further performed for 30 minutes so that the polymerization conversion rate was 98% or more (elastic layer: a crosslinked rubber polymer I).

Next, 0.5 parts by mass of potassium persulfate 3% aqueous solution was placed in the same reactor, and the mixture was stirred for 5 minutes. Then, 341 parts by mass of monomer mixture containing 87.34 mass % of methyl methacrylate, 12.48 mass % of n-butyl acrylate, and 0.18 mass % of n-octyl mercaptan (chain transfer agent) was continuously added dropwise over 100 minutes. After the completion of the dropwise addition, the polymerization reaction was further performed for 60 minutes so that the polymerization conversion rate was 98% or more (an outermost layer polymer (II) graft-bonded to the crosslinked rubber polymer I), thereby obtaining an emulsion containing an acrylic multilayer structure polymer (A-1) having an average particle diameter of 0.09 μm. The acrylic multilayer structure polymer (A-1) is a crosslinked rubber component (A2X) having a three-layer structure of (inner layer)-(elastic layer)-(outermost layer).

Subsequently, the emulsion containing the acrylic multilayer structure polymer (A-1) was frozen at −30° C. for 4 hours. The frozen emulsion was added to warm water at 80° C. in an amount twice the amount of the frozen emulsion, dissolved to form a slurry, kept at 80° C. for 20 minutes, dehydrated, and dried at 70° C. to obtain a powder of the solidified acrylic multilayer structure polymer (A-1) as a methacrylic resin [A2].

The UV absorbers [B] used are described below.

UV Absorber (B-1)
2,2'-Methylenebis[6-(2H-benzotriazol-2-yl)-4-t-octylphenol] (produced by ADEKA Corporation; LA-31))
UV Absorber (B-2)
2,4-Bis[2-hydroxy-4-butoxyphenyl]-6-(2,4-dibutoxyphenyl)-1,3,5-triazine (produced by BASF; Tinuvin-460)
UV Absorber (B-3)
Isooctyl 2-[4,6-bis[(1,1'-biphenyl)-4-yl]-1,3,5-triazin-2-yl]-3-hydroxyphenoxy]propanate (produced by BASF; Tinuvin-479)
The polymers [C] used are described below.
Polymer (C-1)
Septon Q, produced by Kuraray Co., Ltd.: a block copolymer comprising a styrene-based polymer block-hydrogenated diene-based polymer block (weight average molecular weight: 73000)
Polymer (C-2)
Polyvinylidene fluoride resin KF Polymer W #1100, produced by Kureha Corporation (weight average molecular weight: 280000, polymer type: HOMO, intrinsic viscosity: 1.1 dl/g)
Polymer (C-3)
Kurarity, produced by Kuraray Co., Ltd.: a diblock copolymer comprising a methyl methacrylate polymer block and an acrylate ester polymer block comprising n-butyl acrylate and benzyl acrylate, Mw=92000, Mw/Mn=1.06, benzyl acrylate unit/acrylate ester polymer block=25.6 mass %, acrylate ester polymer block/methacrylate ester polymer block (mass ratio)=50/50
Polymer (C-4)
Phenoxy resin YP-50S (product number), produced by Nippon Steel & Sumikin Chemical Co., Ltd., MFR (230° C., 3.8 kg; according to JIS K7210)=22 g/10 min, Mw=55000, Mw/Mn=2.5)
Polymer (C-5)
Polycarbonate resin AL071, produced by Mitsubishi Engineering-Plastics Corporation, My=5500
Polymer (C-6)
Styrene-maleic anhydride-methyl methacrylate copolymer R-200, produced by Denka Co., Ltd., MFR (230° C., 37.3 N)=1.8 g/10 min Example 1

98 parts by mass of the acrylic multilayer structure polymer (A-1) of Production Example 1 was mixed with 1 part by mass of UV absorber (B-1) and 1 part by mass of polymer (C-1), and the mixture was kneaded and extruded with a twin-screw extruder (produced by Technovel Corporation, trade name: KZW20TW-45MG-NH-600) at 240° C. to produce a methacrylic resin composition [1].
The methacrylic resin composition [1] was hot-press molded to form a plate-like molded article (50 mm×50 mm×3.2 mm), and the total light transmittance was measured. Table 1 shows the physical properties of the methacrylic resin composition [1] and the resulting plate-like molded article.
The methacrylic resin composition [1] was extruded with a film-forming machine (model: FS-5, produced by Optical Control Systems) under the following conditions: temperature of cylinder and T-die: 260° C., lip gap: 0.5 mm, extrusion rate: 2.4 kg/hr, roll temperature: 85° C., and film winding speed: 6.3 m/min. The film thickness was adjusted to 100 μm, and roll contamination during film formation was observed. Table 1 shows the evaluation results.

Example 2

A methacrylic resin composition [2] was prepared and evaluated in the same manner as in Example 1, except that the polymer [C] was changed to (C-2).

Example 3

A methacrylic resin composition [3] was prepared and evaluated in the same manner as in Example 1, except that the UV absorber [B] was changed to (B-2).

Example 4

A methacrylic resin composition [4] was prepared and evaluated in the same manner as in Example 1, except that the UV absorber [B] was changed to (B-2) and the polymer [C] was changed to (C-2).

Example 5

A methacrylic resin composition [5] was prepared and evaluated in the same manner as in Example 1, except that the UV absorber [B] was changed to (B-3) and the polymer [C] was changed to (C-2).

Comparative Examples 1 to 10

Methacrylic resin compositions [6] to [15] were prepared and evaluated in the same manner as in Example 1, except that the formulation of each resin composition was changed as shown in Table 2.

TABLE 1

| | Example | | | | |
|---|---|---|---|---|---|
| | 1 | 2 | 3 | 4 | 5 |
| Methacrylic resin composition | [1] | [2] | [3] | [4] | [5] |
| Methacrylic resin [A] (parts by mass) | | | | | |
| [A2] | 98 | 98 | 98 | 98 | 98 |
| Crosslinked rubber component [A2X] (parts by mass) | 55 | 55 | 55 | 55 | 55 |
| Acetone-soluble component [A2Y] (parts by mass) | 45 | 45 | 45 | 45 | 45 |
| Weight average molecular weight of [A2Y] | 80000 | 80000 | 80000 | 80000 | 80000 |
| Copolymer composition of [A2Y] (parts by mass) | | | | | |
| MMA | 87.5 | 87.5 | 87.5 | 87.5 | 87.5 |
| BA | 12.5 | 12.5 | 12.5 | 12.5 | 12.5 |
| UV absorber [B] (parts by mass) | | | | | |
| B-1 | 1 | 1 | | | |
| B-2 | | | 1 | 1 | |
| B-3 | | | | | 1 |
| Compound [C] (parts by mass) | | | | | |
| C-1 (SP value: 9.0) | 1 | | 1 | | |
| C-2 (SP value: 7.5) | | 1 | | 1 | 1 |
| C-3 (SP value: 10.5) | | | | | |
| C-4 (SP value: 12.4) | | | | | |
| C-5 (SP value: 11.5) | | | | | |
| C-6 (SP value: 11.7) | | | | | |
| Film evaluation results | | | | | |
| Roll contamination time (min) | 16.8 | 16 | 28.1 | 15.4 | 16 |
| Total light transmittance (%) | 92 | 92 | 92 | 92 | 92 |

TABLE 2

| | Comparative Example | | | | | | | | | |
|---|---|---|---|---|---|---|---|---|---|---|
| | 1 | 2 | 3 | 4 | 5 | 6 | 7 | 8 | 9 | 10 |
| Methacrylic resin composition | [6] | [7] | [8] | [9] | [10] | [11] | [12] | [13] | [14] | [15] |
| Methacrylic resin [A] (parts by mass) | | | | | | | | | | |
| [A2] | 99 | 98 | 98 | 98 | 99 | 98 | 98 | 99 | 79 | 79 |
| Crosslinked rubber component [A2X] (parts by mass) | 55 | 55 | 55 | 55 | 55 | 55 | 55 | 55 | 55 | 55 |
| Acetone-soluble component [A2Y] (parts by mass) | 45 | 45 | 45 | 45 | 45 | 45 | 45 | 45 | 45 | 45 |
| Weight average molecular weight of [A2Y] | 80000 | 80000 | 80000 | 80000 | 80000 | 80000 | 80000 | 80000 | 80000 | 80000 |
| Copolymer composition of [A2Y] (parts by mass) | | | | | | | | | | |
| MMA | 87.5 | 87.5 | 87.5 | 87.5 | 87.5 | 87.5 | 87.5 | 87.5 | 87.5 | 87.5 |
| BA | 12.5 | 12.5 | 12.5 | 12.5 | 12.5 | 12.5 | 12.5 | 12.5 | 12.5 | 12.5 |
| UV absorber [B] (parts by mass) | | | | | | | | | | |
| B-1 | 1 | 1 | 1 | 1 | | | | | 20 | 1 |
| B-2 | | | | | 1 | 1 | 1 | | | |
| B-3 | | | | | | | | 1 | | |
| Compound [C] (parts by mass) | | | | | | | | | | |
| C-1 (SP value: 9.0) | | | | | | | | | 1 | 20 |
| C-2 (SP value: 7.5) | | | | | | | | | | |
| C-3 (SP value: 10.5) | | 1 | | | | 1 | | | | |
| C-4 (SP value: 12.4) | | | 1 | | | | | | | |
| C-5 (SP value: 11.5) | | | | 1 | | | | | | |
| C-6 (SP value: 11.7) | | | | | | | 1 | | | |
| Film evaluation results | | | | | | | | | | |
| Roll contamination time (min) | 13.2 | 11.3 | 12.2 | 10.6 | 12.1 | 12.1 | 12.9 | 10.5 | 0.3 | 13 |
| Total light transmittance (%) | 92 | 92 | 92 | 92 | 92 | 92 | 92 | 92 | 92 | 45 |

In Examples 1 and 2, roll contamination was reduced compared with Comparative Example 1, and the total light transmittance was maintained. In Examples 3 and 4, roll contamination was reduced compared with Comparative Example 5, and the total light transmittance was maintained. In Example 5, roll contamination was reduced compared with Comparative Example 8, and the total light transmittance was maintained.

On the other hand, in Comparative Examples 2 to 4, 6, and 7, which used the polymers [C] having an SP value outside the range of 6.0 to 9.7 (cal/cm$^3$)$^{1/2}$, roll contamination was not reduced. Further, in Comparative Examples 9 and 10, which used increased amounts of UV absorber [B] and polymer [C], roll contamination was worsened, and the total light transmittance was reduced.

The methacrylic resin compositions of the present invention caused less contamination of the molding equipment during film formation, and had high transparency.

The invention claimed is:

1. A methacrylic resin composition comprising:
   75 to 99.8 mass % of a methacrylic resin,
   0.1 to 15 mass % of a UV absorber, and
   0.1 to 10 mass % of a polymer having a weight average molecular weight of 20000 to 300000 and having an SP value of 6.0 to 9.7 (cal/cm$^3$)$^{1/2}$ calculated by the Fedors method.

2. The methacrylic resin composition according to claim 1, wherein the methacrylic resin comprises a crosslinked rubber component.

3. The methacrylic resin composition according to claim 1, wherein the UV absorber is a benzotriazole or triazine-based compound.

4. The methacrylic resin composition according to claim 1, wherein the polymer is a polymer having a fluorine atom in its structure.

5. The methacrylic resin composition according to claim 1, wherein the polymer is a block copolymer comprising a styrene-based polymer block-hydrogenated diene-based polymer block.

6. A molded article, comprising the methacrylic resin composition according to claim 1.

7. The molded article according to claim 6, which is a film having a total light transmittance of 90% or more.

8. A method for producing the molded article according to claim 6, the method comprising:
   melt-extruding the methacrylic resin composition to obtain a molded article.

* * * * *